United States Patent
Ojima

(10) Patent No.: US 8,270,113 B2
(45) Date of Patent: Sep. 18, 2012

(54) MAGNETIC HEAD CLEANING MECHANISM AND A MAGNETIC TAPE APPARATUS

(75) Inventor: Kenichi Ojima, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 0 days.

(21) Appl. No.: 13/137,674

(22) Filed: Sep. 1, 2011

(65) Prior Publication Data

US 2012/0081814 A1   Apr. 5, 2012

(30) Foreign Application Priority Data

Sep. 30, 2010 (JP) ................. 2010-223234

(51) Int. Cl.
*G11B 5/127* (2006.01)
(52) U.S. Cl. ...................................................... 360/128
(58) Field of Classification Search .................. 360/128
See application file for complete search history.

(56) References Cited

U.S. PATENT DOCUMENTS

| | | | | |
|---|---|---|---|---|
| 5,742,461 A * | 4/1998 | Benson et al. | ................ | 360/128 |
| 5,930,089 A * | 7/1999 | Anderson | ..................... | 360/128 |
| 5,949,629 A * | 9/1999 | Suzuki et al. | ................ | 360/128 |
| 6,166,881 A * | 12/2000 | Anderson et al. | ............. | 360/128 |
| 6,215,618 B1 * | 4/2001 | Anderson et al. | ............. | 360/128 |
| 6,433,961 B1 * | 8/2002 | Tsuchiya et al. | .............. | 360/128 |
| 6,654,194 B1 * | 11/2003 | Masuda et al. | .................. | 360/69 |
| 6,867,947 B2 * | 3/2005 | Davis | ............................ | 360/128 |
| 7,372,668 B2 * | 5/2008 | Tsuneyoshi et al. | .......... | 360/128 |
| 7,688,547 B2 * | 3/2010 | Tanaka | .......................... | 360/128 |
| 2006/0109589 A1 | 5/2006 | Tsuneyoshi et al. | | |
| 2006/0256474 A1 | 11/2006 | Tanaka | | |

FOREIGN PATENT DOCUMENTS

JP 2006-155683 6/2006
JP 2006-318563 11/2006

* cited by examiner

*Primary Examiner* — Mark Blouin
(74) *Attorney, Agent, or Firm* — McGinn IP Law Group, PLLC

(57) ABSTRACT

In a magnetic head cleaning mechanism applicable to a magnetic tape apparatus using a threading system, a cleaning member is placed at a cleaning position with high precision without excessively pushing the cleaning member. For this purpose, an arm to move a cleaning bristle to clean a magnetic head is disposed at a position on a side of the magnetic head relative to a threader track. The bristle moves through a moving path guided by a cam groove. The bristle first moves toward the threader track and then toward the cleaning position in front of the magnetic head. During the movement to approach the magnetic head through the moving path, the bristle does not exceed the cleaning position.

6 Claims, 9 Drawing Sheets

MAGNETIC HEAD CLEANING MECHANISM AND A MAGNETIC TAPE APPARATUS

This application is based upon and claims the benefit of priority from Japanese patent application No. 2010-223234, filed on Sep. 30, 2010, the disclosure of which is incorporated herein in its entirety by reference.

BACKGROUND OF THE INVENTION

1. Field of the Invention

The present invention relates to a magnetic head cleaning mechanism to clean a magnetic head to write information on and to read information from a magnetic tape and a magnetic tape apparatus including the magnetic head cleaning mechanism.

2. Description of the Prior Art

In general, a magnetic tape apparatus includes a mechanism which operates at installation of a magnetic tape cartridge therein to transport a tip end of the magnetic tape wound on a supply reel in the cartridge up to a hub of a take-up reel in the magnetic tape apparatus to fixedly attach the tip end onto the hub.

For such operation, there has been known a mechanism called a threading system or method. According to the threading system, a cam gear and a threading arm to be moved by the cam gear are employed to transport a leader block along a magnetic tape transport path up to a supply reel. Also, after a leader pin installed at a tip end of a magnetic tape is engaged with the leader block, the leader block is transported along the magnetic tape transport path up to a take-up reel. The magnetic tape transport path will be referred to as a threader track hereinbelow.

To keep appropriate reading and writing performance of a magnetic head, it is required to periodically clean the magnetic head.

For this purpose, a mechanism to clean a magnetic head may be configured such that an arm provided with a cleaning brush is disposed in the magnetic tape apparatus at a position where the cleaning brush does not hinder running of the tape in an ordinary state. To clean the magnetic head, the arm is moved to bring the brush into contact with the magnetic head.

In a magnetic tape apparatus employing the threading system, the threading arm moves through an upper or lower position over the threader track or over a region on the side of the magnetic head relative to the threader track.

In a known configuration for this operation, the threader track is arranged between the magnetic head and an arm section including an arm provided with a brush and a driving source to move the arm (reference is to be made to, for example, Japanese Patent Laid-Open Ser. Nos. 2006-155683 and 2006-318563).

As FIG. 1 shows, it is considerable to dispose an arm 101 with a brush 103 on the same side as a magnetic head 105 relative to a threader track 109.

In a configuration example of FIG. 1, a brush link arm 101 is disposed on a cam gear 104 to move a threading arm, not shown. In the brush link arm 101, a pivot 102 is arranged on a first end and a brush 103 is disposed on a second end. The brush link arm 101 turns clockwise or counterclockwise about the pivot 102 attached onto a base, not shown.

The brush link arm 101 includes a projection 121 and the cam gear 104 includes a projection depressing section 120. When a driving source, not shown, drives a gear 110 to rotate, causing the cam gear 104 to turn, the projection depressing section 120 accordingly rotates to depress the projection 121 of the brush link arm 101. As a result, the brush link arm 101 rotates clockwise or counterclockwise.

In response to the rotation of the brush link arm 101 about the pivot 102, the brush 103 on the opposing end of the arm 101 is moved from a standby state shown in FIG. 1(a) via a state of FIG. 1(b) in which the brush is in contact with the magnetic head 105, to a cleaning position shown in FIG. 1(c). Further, according to the rotation of the cam gear 104, the brush 103 moves in the reverse direction.

Next, description will be respectively given of problems of the prior arts.

According to the configurations described in Japanese Patent Laid-Open Ser. Nos. 2006-155683 and 2006-318563, the threader track is arranged between the magnetic head and the arm provided with the brush. Hence, the cleaning brush, the arm, and the driving source are disposed on the side opposite to the side of the magnetic head with respect to the threader track. Therefore, to bring the brush into contact with the magnetic head, it is required to move the brush over the threader track in the cleaning operation. This disadvantageously leads to a longer stroke of the brush.

The brush moving path is a dead space where no parts are to be installed. Hence, it is favorable to reduce the stroke to downsize the apparatus.

To remove the problem of the longer stroke, if the brush and the magnetic head are placed on the same side with respect to the threader track, it is difficult, due to existence of the cam gear to move the threading arm, to install the driving source to move the arm, on the magnet head side.

Further, when the brush is installed on the magnetic head side relative to the threader track and the driving source is arranged on the opposite side of the magnetic head with respect to the threader track, it is structurally difficult to move the brush in this situation. Specifically, according to the configuration of the magnetic tape apparatus using the threading system, the threading arm moves through an upper or lower position over the threader track or over a region on the side of the magnetic head relative to the threader track. Hence, it is difficult to dispose, on the brush disposed on the same side as the magnetic head relative to the threader track, a mechanism to supply power from the driving source installed on the opposite side of the magnetic head with respect to the threader track without causing interference with the threading arm.

Hence, in the configuration example of FIG. 1, the brush 103 is installed on the same side as the magnetic head 105 relative to the threader track 109. In operation, the projection depressing section 120 is directly related to the rotation of the cam gear 104 such that the projection 121 rotates the brush link arm 101.

However, in the standby state of FIG. 1(a), the brush 103 is on the rear surface side of the magnetic head 105 when viewed from the threader track 109. That is, the brush 103 is on the rear side, which is an opposite side of the side of a front surface of the magnetic head 105 to be cleaned.

The brush 103 is moved by the rotation of the brush link arm 101 from the standby state of FIG. 1(a) to the cleaning position of FIG. 1(c). For this purpose, the brush 103 moves through the path while making contact with the magnetic head 105 with the smaller distance to the magnetic head 104 in the brush contact position shown in FIG. 1(b) than in the cleaning position. Hence, during the movement of the brush 103 from the standby state of FIG. 1(a) to the cleaning position of FIG. 1(c), the brush 103 is kept pushed against the magnetic head 105. As a result, it is feared that excessive load is applied to the brush bristle of the brush 103, leading to a disadvantage that life of the bristle is shortened.

Also, according to the configuration, while the distance from the pivot 102 as the fulcrum to the contact point as the point of force between the projection depressing section 120 and the projection 121 is relatively small, the distance from the pivot 102 to the brush 103 as the point of action is relatively large. Hence, when an unstable state appears, there exists a fear that the unstable state becomes worse. It is therefore difficult to position the brush 103 with high precision.

SUMMARY OF THE INVENTION

The present invention is devised to solve the problems described above. It is therefore an object of the present invention to provide a magnetic head cleaning mechanism applicable to a magnetic tape apparatus using the threading system and a magnetic tape apparatus including the magnetic head cleaning mechanism. The magnetic head cleaning mechanism is capable of most suitably cleaning a magnetic head by conducting the positioning operation with high precision while driving the cleaning member by use of a smaller space without excessively pushing the cleaning member.

To achieve the object in accordance with the present invention, there is provided a magnetic head cleaning mechanism employing a threading system comprising a threading arm which transports a leader pin disposed at a tip end of a magnetic tape wound on a supply reel up to a take-up reel. The threading arm transports the magnetic tape through a threader track. The magnetic head cleaning mechanism comprises a magnetic head for magnetically writing and reading data on and from the magnetic tape, a cam gear arranged on a side of the magnetic tape relative to the threader track for driving the threading arm, an arm mechanism including a cleaning member, and a base member for supporting the arm mechanism.

The arm mechanism comprises a cleaning-side arm section including the cleaning member at a first end thereof and a support-side arm section. The support-side arm section includes a first end which rotably and pivotally supports the cleaning-side arm section and a second end which is rotably and pivotally supported by the base member.

The base member comprises a guide section to guide a moving path of the cleaning member.

The cleaning-side arm section comprises an engage section which engages with the guide section and which is movable along the guide section.

The support-side arm section is moved by pushing pressure from the cam gear when the cam gear rotates up to a predetermined position.

The guide section is formed to guide the moving path of the cleaning member such that the cleaning member moves through the moving path from a standby position on a side of the magnetic head relative to the threader track toward the threader track and thereafter moves from the threader track toward the magnetic head to thereby reach a predetermined cleaning position in front of the magnetic head.

In accordance with the present invention, there is provided a magnetic tape apparatus, characterized by comprising a magnetic head cleaning mechanism in accordance with claim 1.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Figure 1:
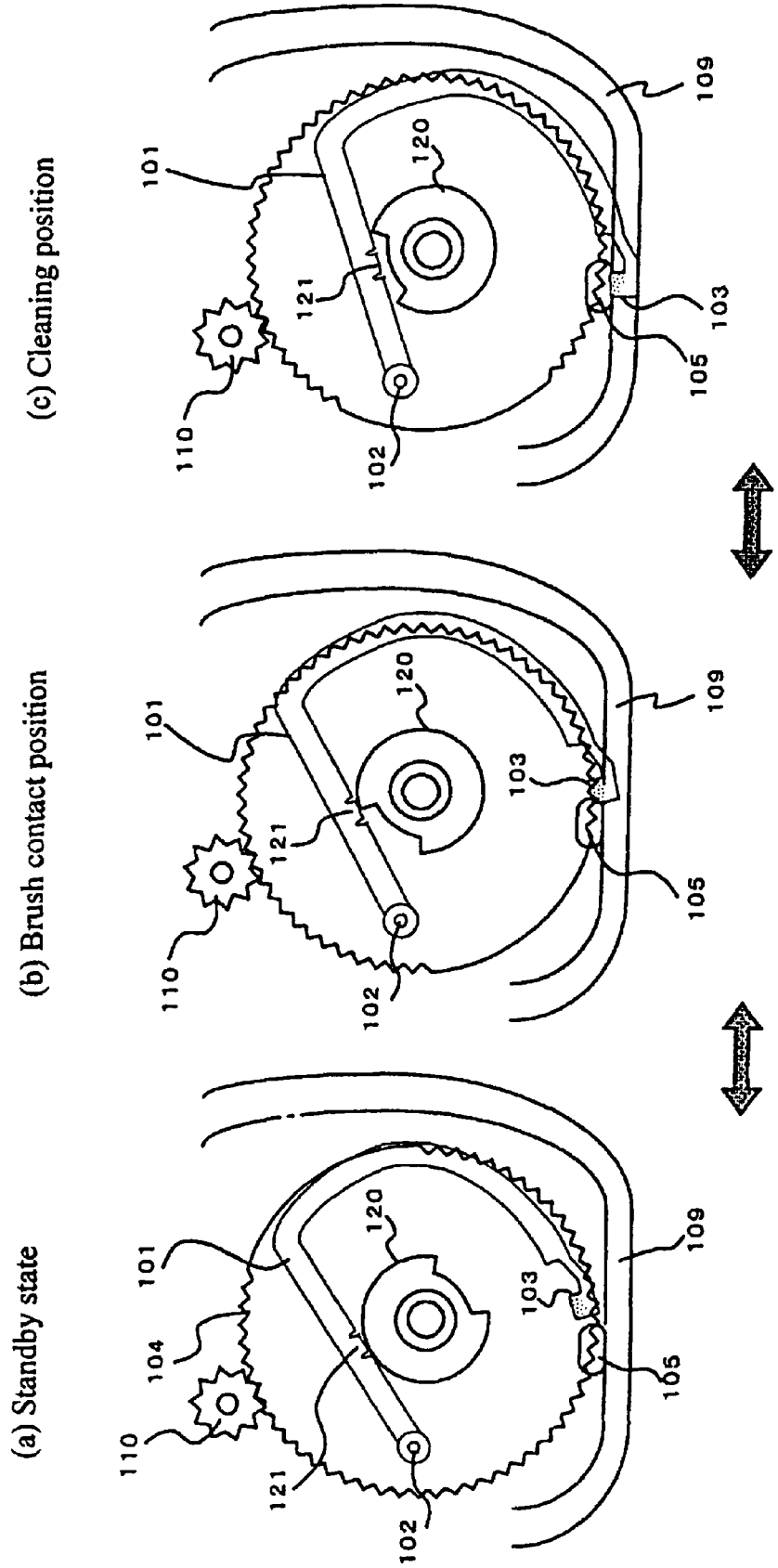
FIG. 1 is a diagram schematically showing an example of operations of a magnetic head cleaning mechanism in the prior art.

Referring now to the drawings, description will be given in detail of an embodiment of a magnetic head cleaning mechanism and a magnetic tape apparatus in accordance with the present invention.

First, description will be given of an outline of the embodiment.

In the present embodiment of the magnetic head cleaning mechanism, an arm to move a cleaning bristle is disposed at a position on the side of a magnetic head relative to a threader track. The mechanism primarily includes three partitions or sections, which provide a bristle moving path with a higher degree of freedom. The bristle moving path is guided by use of a cam groove so that the bristle moves through an arc-shaped path to a cleaning position in front of the magnetic head. That is, in the bristle moving path, the bristle approaches the magnetic head up to at most the cleaning position, not exceeding the cleaning position.

The brush positioning precision is improved by disposing a cam groove shaft in the vicinity of the bristle in the arm, the cam groove shaft having a moving path to be guided by the cam groove.

Hence, it is possible to move the brush bristle without excessively pushing the bristle, to thereby position the bristle with high precision without wearing the bristle.

Next, description will be given of the magnetic head cleaning mechanism according to the present embodiment.

The magnetic head cleaning mechanism employing the threading system transports a tip end of a magnetic tape wound on a supply reel in a cartridge up to a hub of a take-up reel in a magnetic tape apparatus.

For this purpose, a leader pin arranged on a tip end of the magnetic tape is engaged by use of a leader block in the cartridge such that the tip end is drawn up to the take-up reel by a threading arm.

Description will now be given of a configuration of the magnetic tape cleaning mechanism in the proximity of the cam gear to drive the threading arm. In this regard, since the configuration to draw the leader pin at the end of the magnetic tape in the threading method is well known, detailed description and drawings thereof will be avoided.

Figure 2:
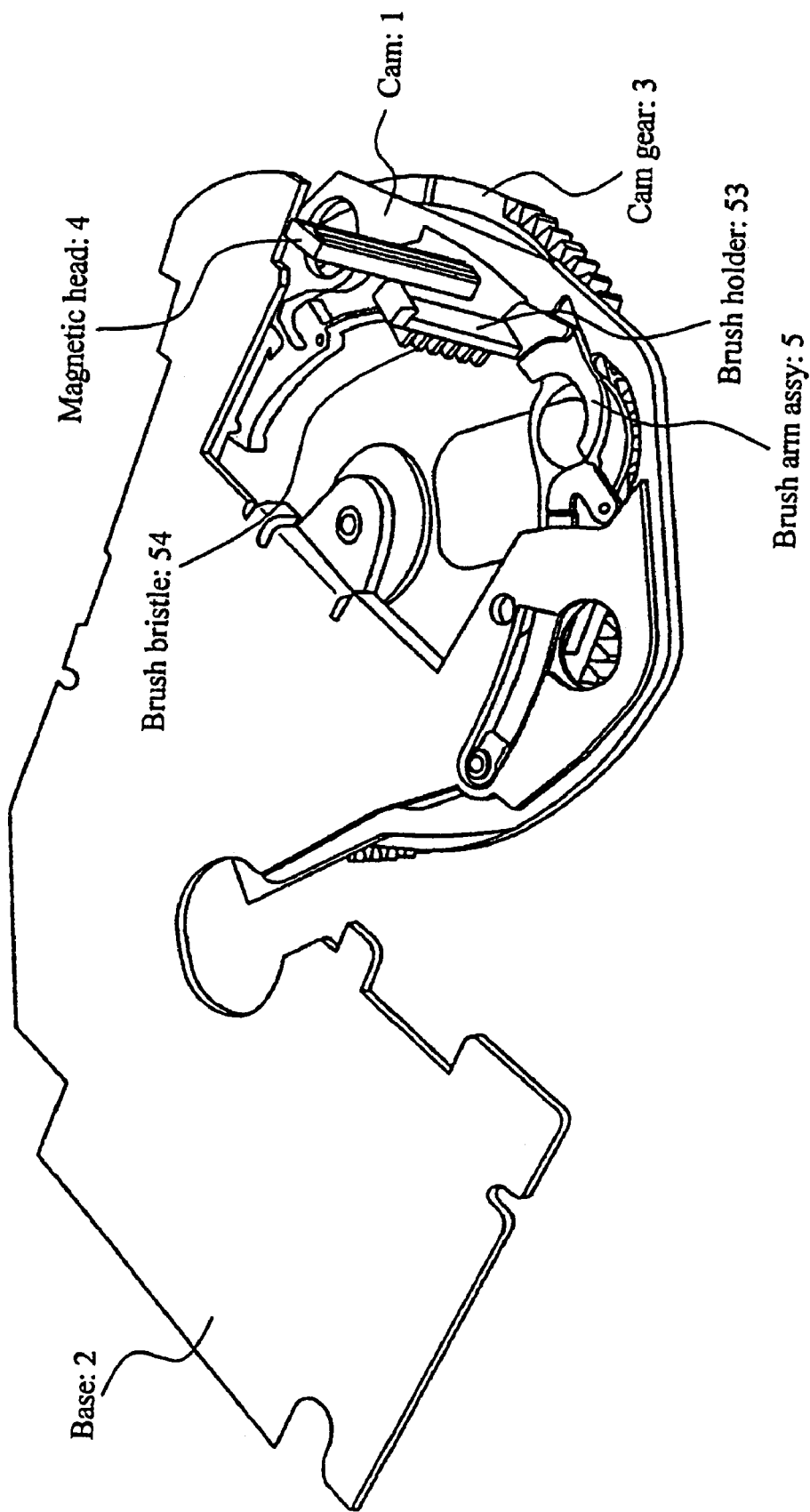
FIG. 2 is a perspective view showing a main section of a magnetic head cleaning mechanism in an embodiment in accordance with the present invention.
Figure 3:
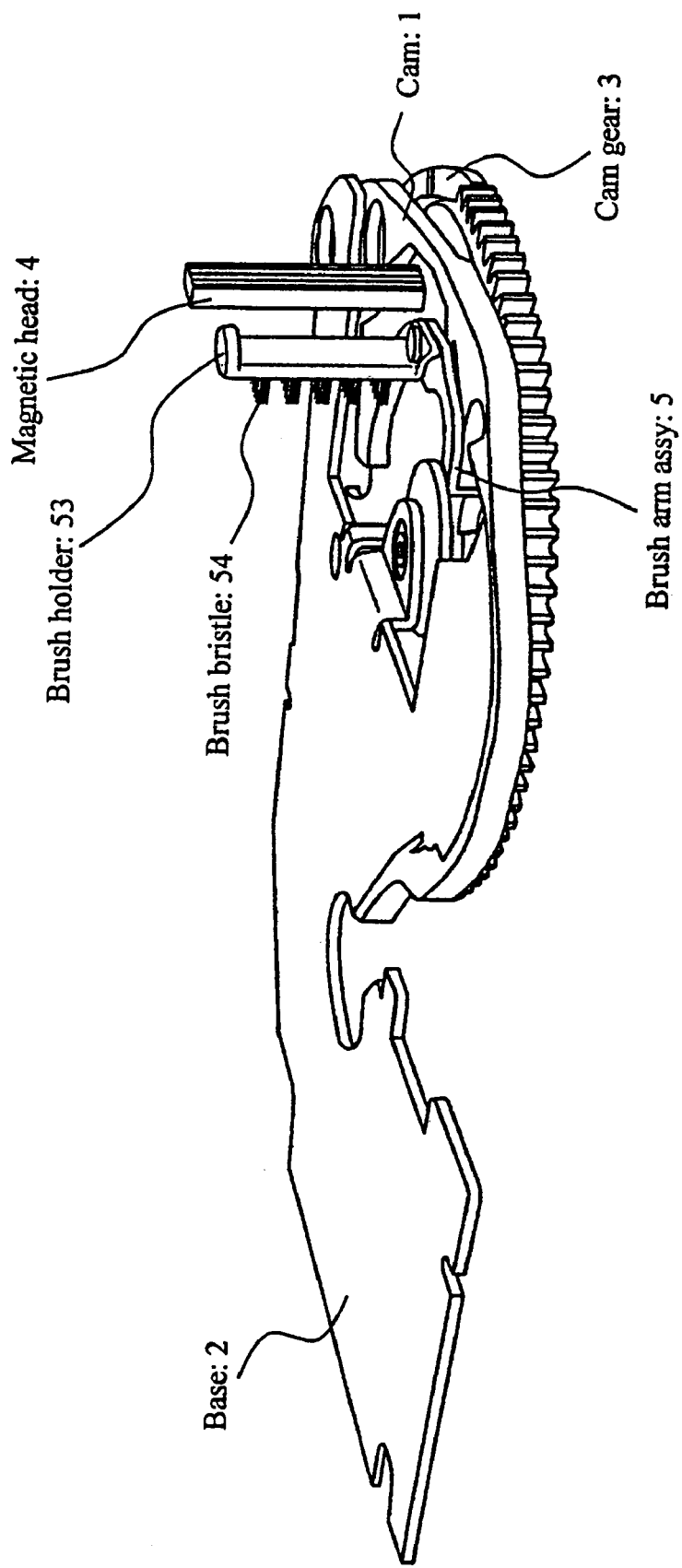
FIG. 3 is a perspective view showing the main section viewed from another angle.

FIGS. 2 and 3 show perspective views of the main section of the magnetic tape cleaning mechanism in accordance with the present embodiment.

As FIGS. 2 and 3 show, the magnetic tape cleaning mechanism, which is disposed in the neighborhood of a magnetic tape 4, includes a base 2, a cam gear 3 to drive a threading arm, not shown, and a brush arm assembly 5 as an arm unit to move a bristle.

The base 2 and the cam 1 are fixedly attached onto each other by screws, not shown, and serve as base members to support a movable section of the magnetic tape cleaning mechanism.

Figure 4:
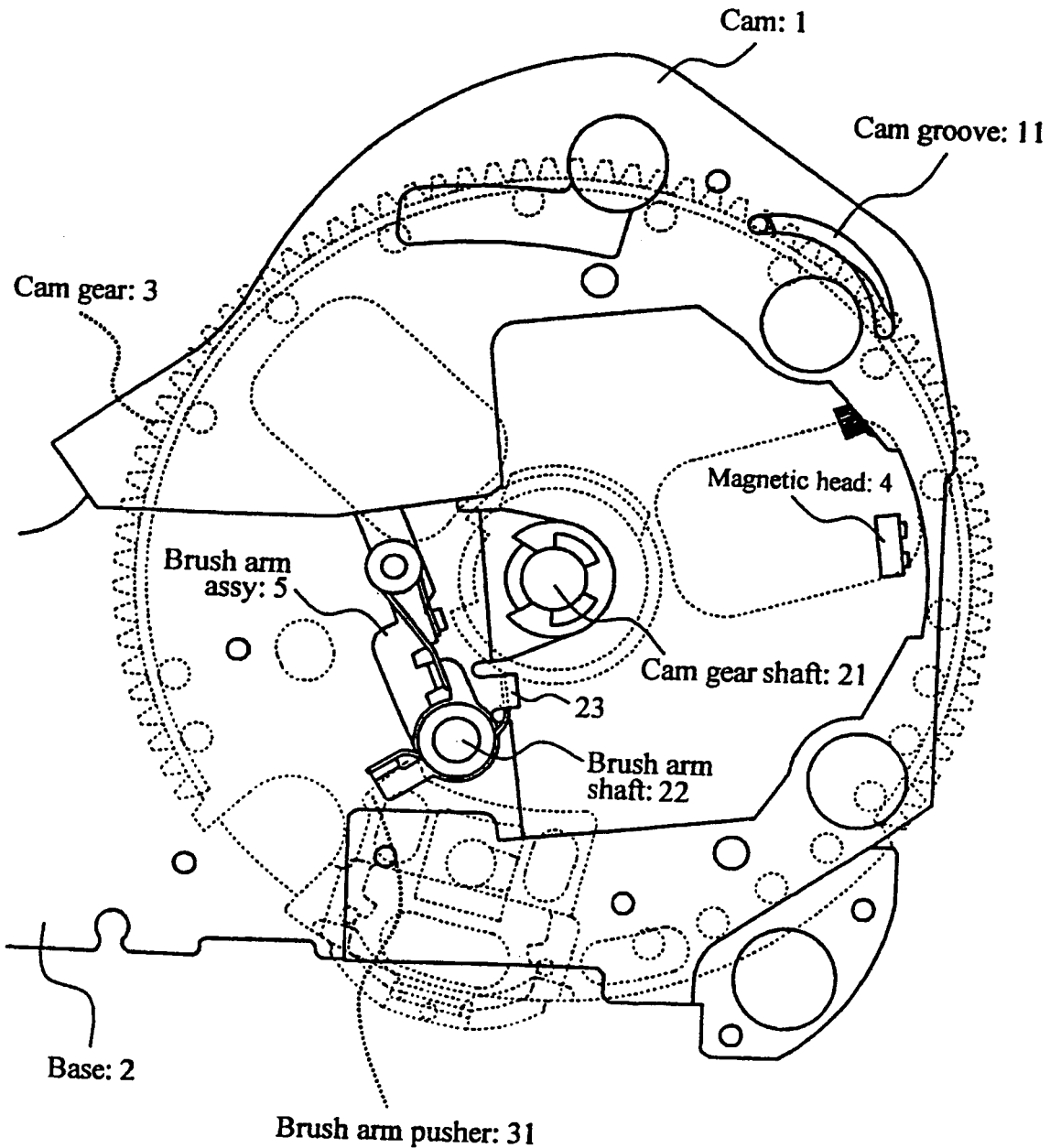
FIG. 4 is a diagram showing the main section in the periphery of a cam gear in a standby state.
Figure 5:
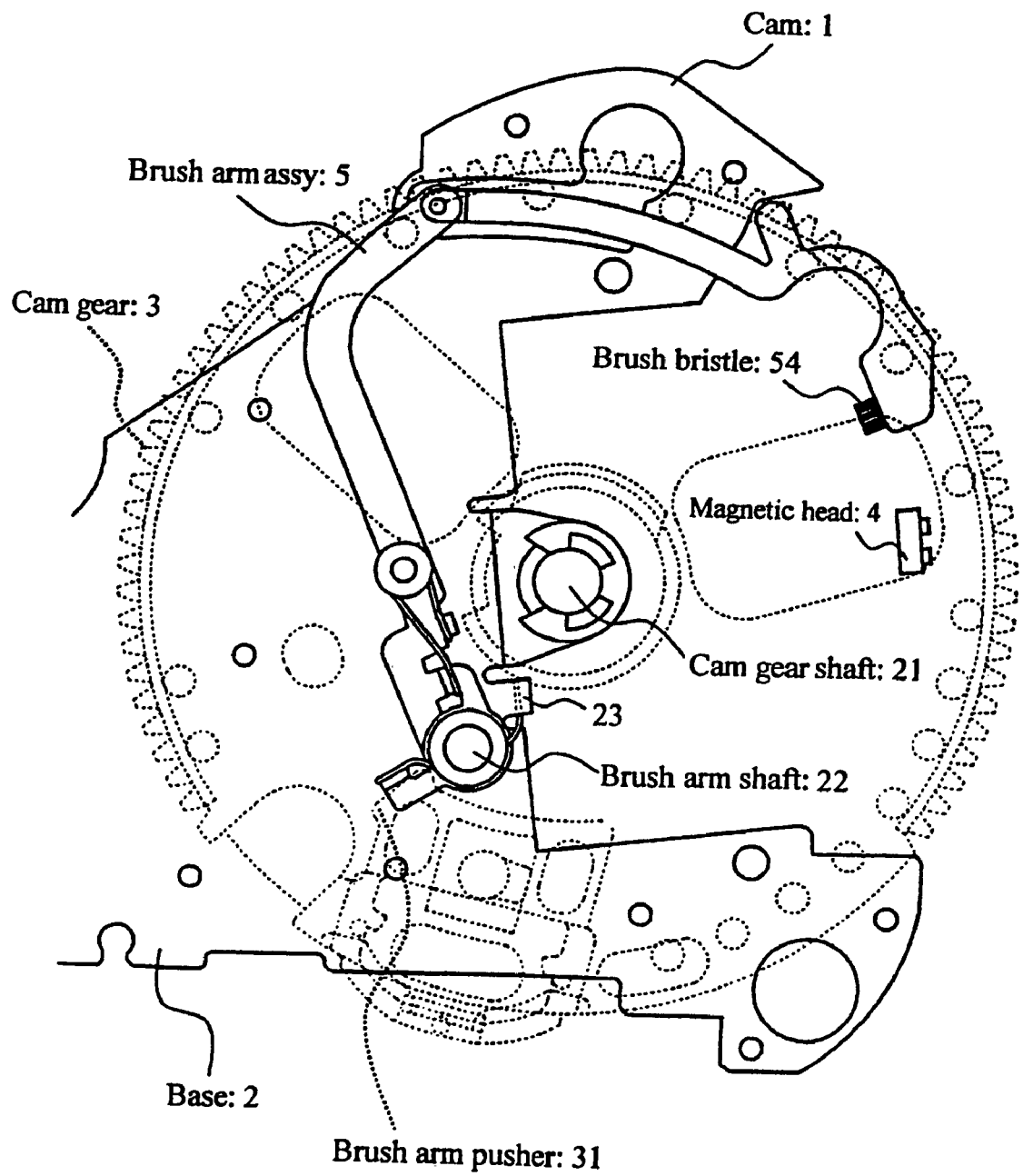
FIG. 5 is a diagram showing the main section drawn by removing a cam from the configuration shown FIG. 4.

FIGS. 4 and 5 show an example of the main section of the magnetic tape cleaning mechanism in a standby state. FIG. 4 is a perspective view of the main section in the vicinity of the cam gear 3, drawn by viewing the diagrams of FIGS. 2 and 3 from a rear side thereof with the cam gear 3 indicated by use of dotted lines. FIG. 5 shows a state implemented by removing the cam 1 from FIG. 4.

In the magnetic tape cleaning mechanism as shown in FIGS. 4 and 5, a cam gear shaft 21 is pushed into the base 2 and the cam gear 3 is arranged to be clockwise and counterclockwise rotable about the cam gear shaft 21.

Also, a brush arm shaft 22 to serve as a fulcrum of the brush arm assembly 5 is pushed into the base 2, to rotably and pivotally support the assembly 5.

The base 2 includes a pushing depression 23 formed by bending a metal plate as a constituent component of the base 2. The pushing depression 23 supports an end of a retraction-side spring (retraction energizing section) 56 of the brush arm assembly 5, which will be described later. The retraction-side spring 56 pushes the assembly 5 in a direction to the standby state shown in FIGS. 4 and 5.

The cam gear 3 includes a brush arm pusher 31 formed as a pushing projection. When the cam gear 3 rotates a predetermined angle, the brush arm pusher 31 pushes a brush pivot 58 of the brush arm assembly 5, which will be described later.

In the standby state shown in FIGS. 4 and 5, the leader pin at the magnetic tape end is drawn up to the take-up reel by the threading arm, not shown. In this state, the magnetic head 4 is capable of writing data on or reading data from the magnetic tape.

Figure 6:
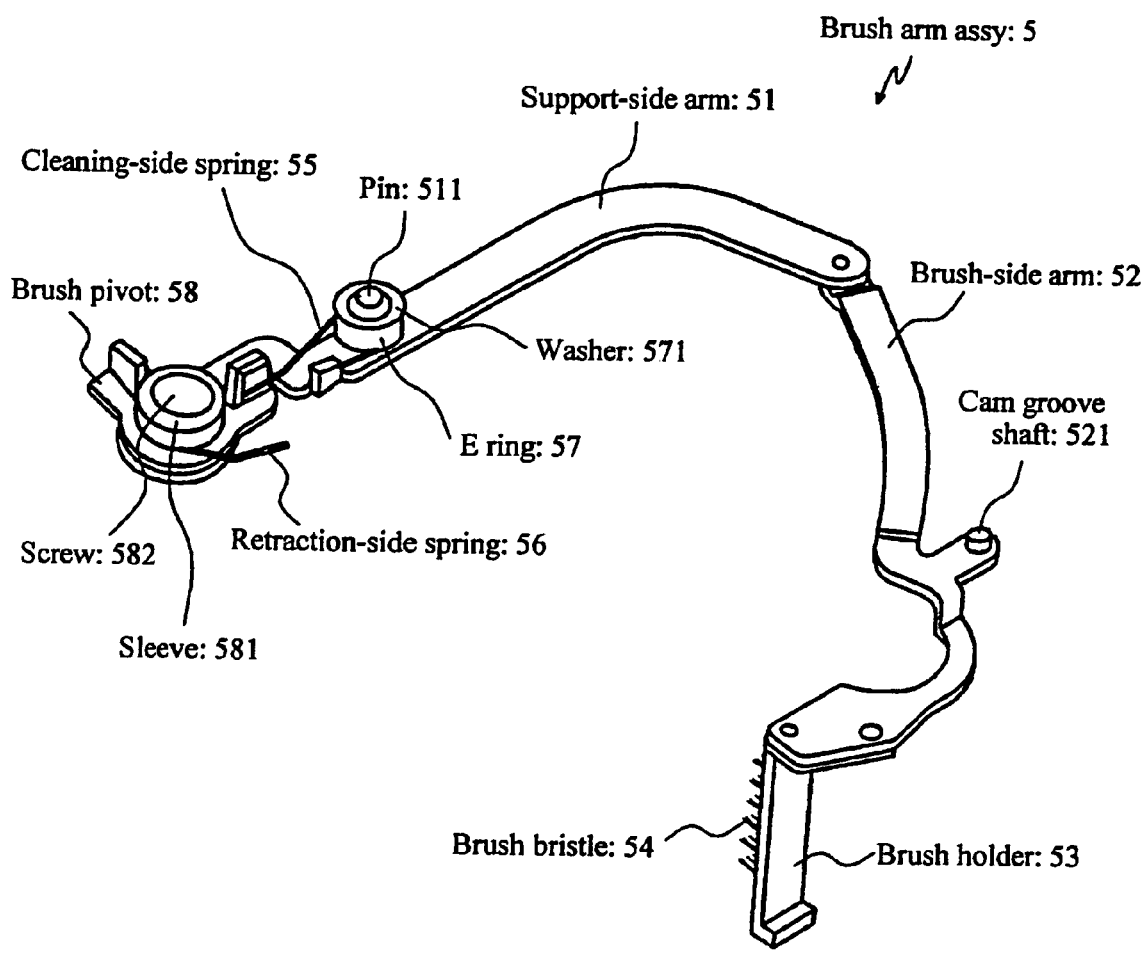
FIG. 6 is a perspective view showing structure of a brush arm assembly.

FIG. 6 shows a configuration of the brush arm assembly 5.

The brush arm assembly 5 primarily includes three sections, namely, a support-side arm 51, a brush-side arm 52, and a brush pivot (pushing pressure transmitting section) 58. Each section includes various parts. These three sections provide the moving path of the brush bristle (cleaning member) 54 with a higher degree of freedom.

The brush-side arm 52 includes a first end and a second end. On the first end, a brush holder 53 to be planted with a brush bristle 54 is arranged. The second end of the brush-side arm 52 is rotably and pivotally arranged on an end of the support-side arm 51. Between the brush holder 53 and the end of the support-side arm 51 as an axial support point, a branch is formed in the form of a projection at a position relatively near the brush holder 53. At an end of the branch, a cam groove shaft 521 is disposed.

The cam groove shaft 521 is formed in the shape of a cylinder having an outer diameter substantially equal to width of the cam groove 11 disposed in the cam 1. Hence, when inserted into the cam groove 11, the shaft 521 is movable along the groove 11.

The support-side arm 51 is pivotally supported by the brush arm shaft 22, the support-side arm 51 being coaxial with the brush pivot 58.

On an outer circumference of the brush pivot 58, a sleeve 581 is rotably attached to be coaxial with the brush arm shaft 22. In addition, on an outer circumference of the sleeve 581, a retraction-side spring 56 is rotably and coaxially pivoted by the brush arm shaft 22.

The brush arm shaft 22 includes a screw hole bored at an end thereof, and a screw 582 is engaged in the screw hole. As a result, the support-side arm 51, the brush pivot 58, the sleeve 581, and the retraction-side spring 56 are coaxially and rotably pivoted on the brush arm shaft 22.

The retraction-side spring 56 includes a first end held in the pushing depression 23 of the base 2 and a second end held to be in contact with a projection of the brush pivot 58, to thereby push the brush pivot 58 in a direction in which the brush arm assembly 5 is set to the standby state shown in FIGS. 4 and 5.

Therefore, the brush arm assembly 5 is in the standby state shown in FIGS. 4 and 5 unless it is pushed or depressed.

In the support-side arm 51, a pin 511 is installed. On an outer circumference of the pin 511, an E ring 57 is rotably and pivotally attached via a washer 571 to be coaxial with the pin 511.

On an outer circumference of the E ring 57, a cleaning-side spring (cleaning energizing section) 55 is arranged. The cleaning-side spring 55 is supported such that a first end thereof is in contact with a projection of the brush pivot 58 and a second end thereof is in contact with a projection of the support-side arm 51.

Resultantly, when the cam groove shaft 521 is movable along the cam groove 11, that is, when the brush-side arm 52 is movable, the brush pivot 58 and the support-side arm 51 are linked with each other and move as one unit due to restoring force of the cleaning-side spring 55.

In a situation in which the cam groove shaft 521 has moved up to an end of the cam groove 11 and cannot move further, that is, the brush-side arm 52 is unmovable, when the brush pivot 58 rotates clockwise in the drawings of FIGS. 4 and 5, namely, in the direction to drive the brush bristle 54 to approach the cleaning position in front of the magnetic head 4, the restoring force of the cleaning-side spring 55 causes the support-side arm 51 to apply pushing pressure onto a contact position of contact between the cam-groove shaft 521 and the end of the cam groove 11.

Figure 7:
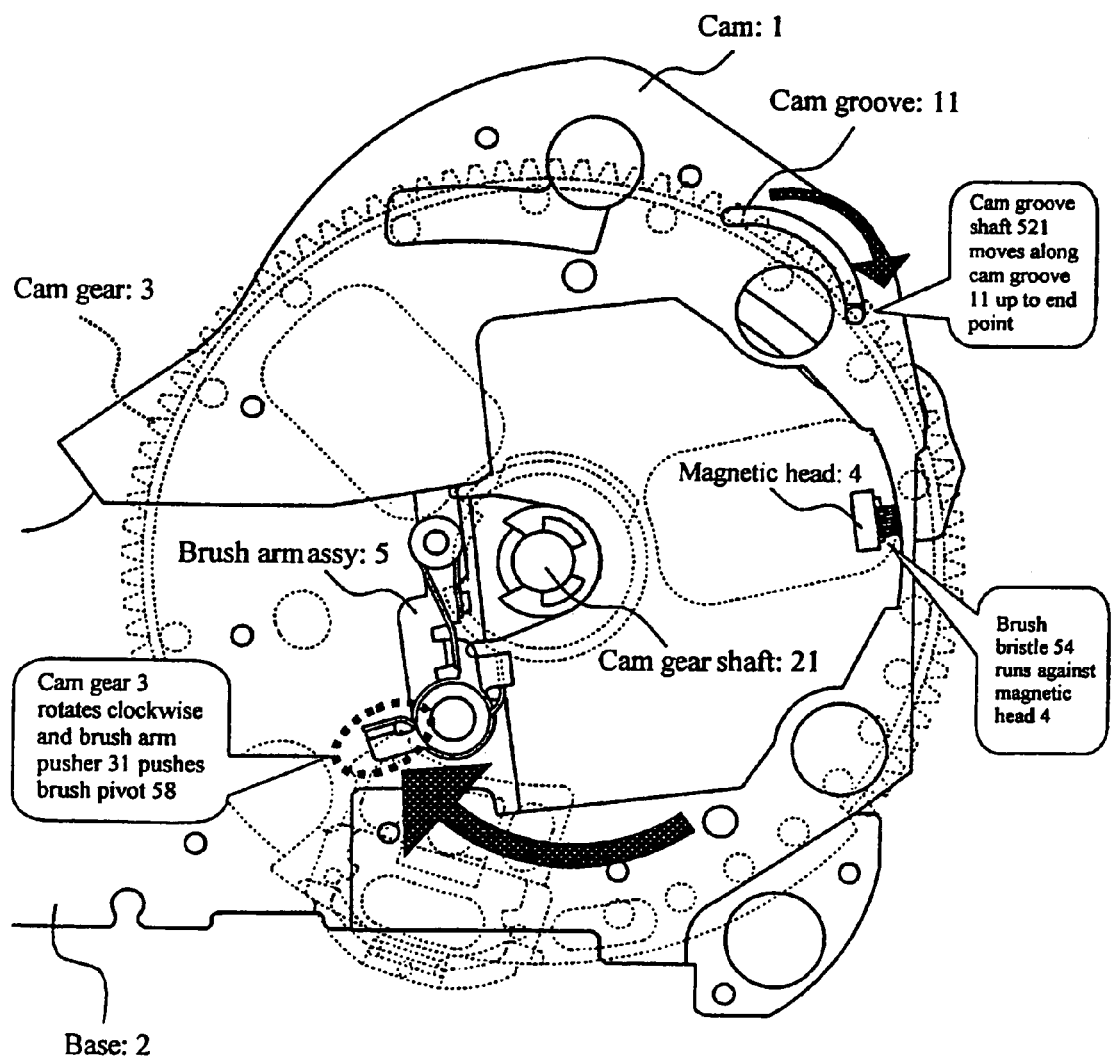
FIG. 7 is a diagram showing the main section in which a brush bristle is in contact with a magnetic head.

FIG. 7 shows a state in which the cam gear 3 rotates clockwise from the standby state of FIGS. 4 and 5 and the brush bristle 54 is brought into contact with the magnetic head 4.

In operation of the cam gear 3, turning force from a driving source, for example, a motor, not shown, is transmitted via, e.g., a gear, not shown, to the cam gear 3 for rotation thereof.

When the cam gear 3 clockwise rotates a predetermined angle, the brush arm pusher 31 formed as a projection on a side surface of the cam gear 3 pushes the projection of the brush pivot 58. Hence, the brush pivot 58 clockwise rotates. Due to the restoring force of the cleaning-side spring 55, the support-side arm 51 turns as a unit together with the brush pivot 58.

In response to the rotation of the support-side arm 51, the brush-side arm 52 also moves and then the cam groove shaft 52 travels along the cam groove 11. FIG. 7 shows a state in which the cam groove shaft 52 moves along the cam groove 11 as described above up to an end point of its movable zone in the cam groove 11.

Figure 8:
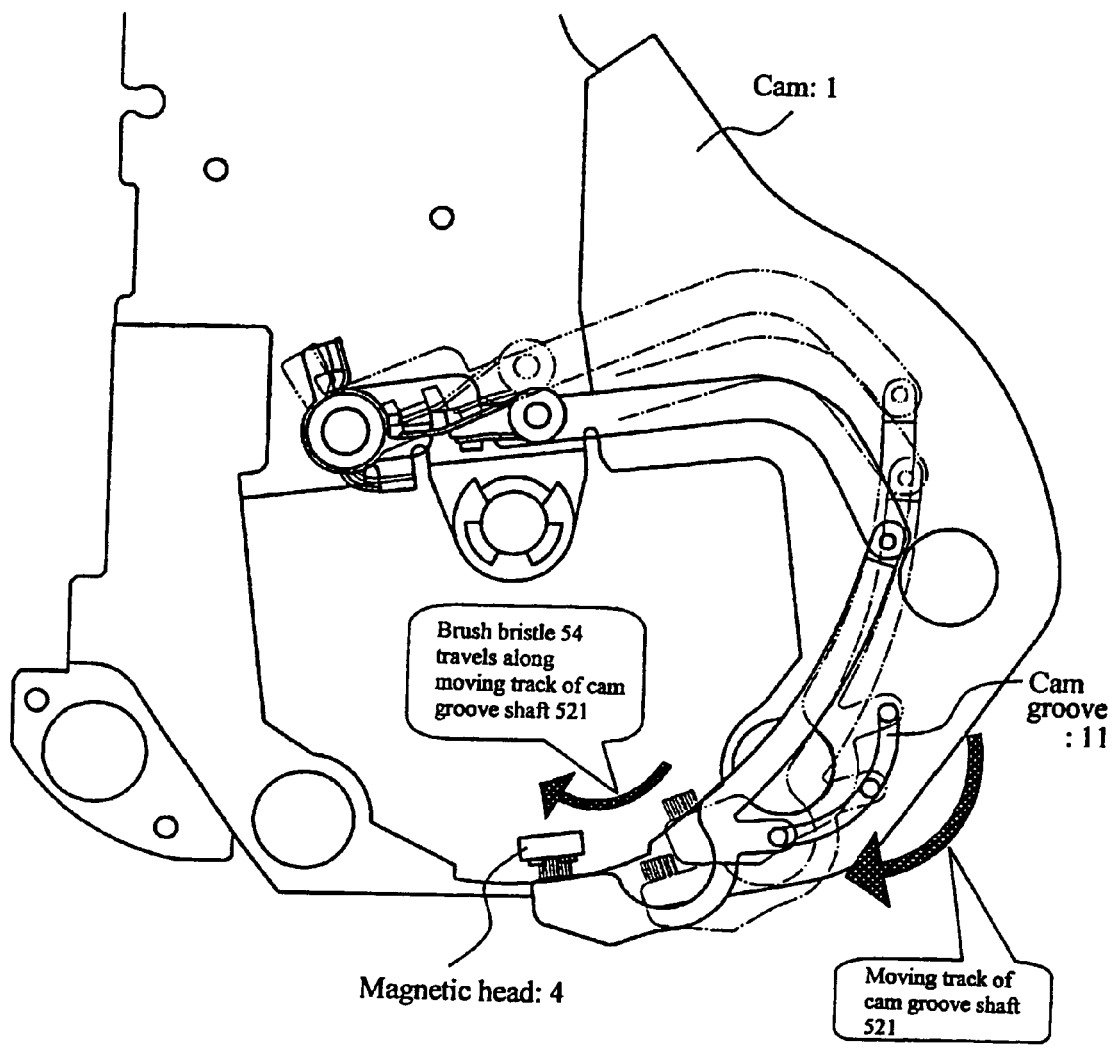
FIG. 8 is a diagram of the main section to explain a moving path of the brush bristle up to the magnetic head.

As FIG. 7 shows, the cam groove 11 is formed in the shape of an arc in the cam 1. Hence, when the cam groove shaft 521 moves through a moving path arranged in the shape of an arc along the cam groove 11, the brush bristle 54 also travels through an arc-shaped moving path by following the moving path of the cam groove shaft 521 as shown in FIG. 8.

As above, the brush bristle 54 first moves from the standby state shown in FIGS. 4 and 5 in a direction toward a position in front of the magnetic head 4, the position being apart from the magnetic head 4. Thereafter, the brush bristle 54 travels to the cleaning position in front of the magnetic head 4. As a result, the brush bristle 54 travels through an arc-shaped moving path. Hence, the brush bristle 54 moves from the standby position to the cleaning position without exceeding the cleaning position in front of the magnetic head 4.

Therefore, it is possible to move the brush bristle 54 from the standby position to the cleaning position without causing the disadvantage state in which the distance between the brush bristle 54 and the magnetic head 4 becomes very small in the moving path from the standby position to the cleaning position and excessive load is imposed onto the brush bristle 54.

Figure 9:
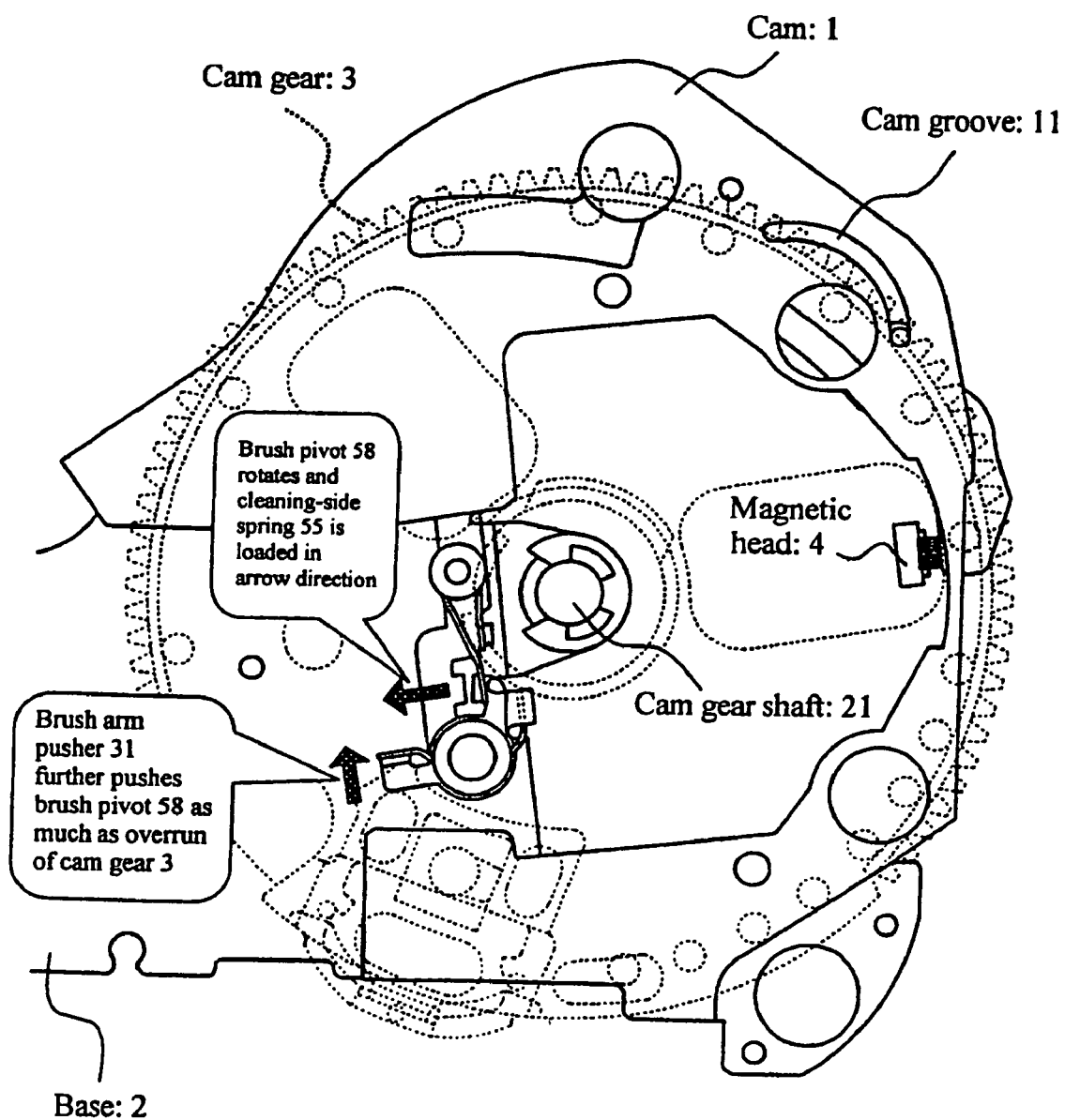
FIG. 9 is a diagram showing the main section in which the cam gear has clockwise rotated up to an end of a movable zone.

FIG. 9 shows a variation of FIG. 7 in which the cam gear 3 has further clockwise rotated.

As described above, the cam gear 3 urges the threading arm, not shown, to draw a leader pin installed at an end of a magnetic tape up to a take-up reel. In this state, the leader pin has been moved by the threading arm up to an end of the movable zone in the cartridge accommodating the magnetic tape. Specifically, FIG. 9 shows a state of the end section in the tape accommodating direction, i.e., the cam gear 3 has clockwise rotated up to the end of its rotable range.

In the state shown in FIG. 7, since the cam groove shaft 521 has already traveled up to the end of the movable range of the cam groove 11, even if the cam gear 3 further clockwise rotates, none of the brush-side arm 52 and the support-side arm 51 can travel further. Hence, due to pushing pressure from the brush arm pusher 31, the brush pivot 58 rotates and overruns the support-side arm 51 to further elastically deform the cleaning-side spring 55.

Due to restoring force resulted from the elastic deformation, the cleaning-side spring 55 pushes the support-side arm 51 against the contact position between the cam-groove shaft 521 and the end of the cam groove 11. The pressure from the cleaning-side spring 55 prevents occurrence of unstable actions or states in the contact sections between the support-side arm 51 and the brush-side arm 52 and between the cam-groove shaft 521 and the end of the cam groove 11.

Hence, in the state in which the unstable actions are suppressed, the brush bristle 54 is moved to the predetermined cleaning position in front of the magnetic head 4 through a reliable positioning operation with high precision.

As above, after the cam gear 4 rotates up to the end point of the rotable zone, the brush bristle 54 is placed at the cleaning position shown in FIG. 9. Hence, it is possible to automatically move the brush bristle 54 to the predetermined cleaning position without requiring any particular positioning operation.

In the situation in which the brush bristle 54 is placed at the predetermined cleaning position, the leader pin at the end of the magnetic tape has been moved by the threading arm to the end of the movable zone in the cartridge. In this state, to restore the tracking correction position to the initial state, the magnetic head 4 moves in a direction parallel to the brush bristle 54. Through the parallel movement of the magnetic head 4, the brush bristle 54 cleans inner surfaces of longitudinal grooves of the magnetic head 4 shown in, e.g., FIG. 3. Since the operation of the magnetic head 4 for the tracking correction is well known, description thereof will be skipped.

According to the embodiment of the present invention, in a magnetic tape apparatus employing the threading system, while the brush arm assembly 55 including the brush bristle 54 is disposed on the side of the magnetic head relative to the threader track, the brush arm assembly 5 is moved by use of the rotation of the cam gear 3 which is rotated by the driving source for the threading mechanism. Therefore, the cleaning mechanism can be advantageously implemented in a smaller space.

The brush bristle 54 travels along the moving path of the cam groove shaft 521 through the arc-shaped cam groove 11. Hence, the brush bristle 54 first moves from the standby position, which is on the side of the magnetic head relative to the threader track, toward the threader track and then travels from the threader track to the front of the magnetic head 4, to finally arrive at the predetermined cleaning position in front of the magnetic head 4. Therefore, the brush bristle 54 can move from the standby position to the cleaning position without excessively approaching the magnetic head 4, i.e., without exceeding the cleaning position.

Hence, it is possible to move the brush bristle 54 from the standby position to the cleaning position without imposing any excessive load onto the brush bristle 54. This advantageously reduces wear of the brush bristle 54 to the maximum extent, leading to long life of the brush bristle 54.

Also, the brush bristle 54 travels along the moving path of the cam groove shaft 521 placed at a position relatively near the brush holder 53. Resultantly, since the distance between the brush arm shaft 22 as the fulcrum and the cam groove shaft 521 to guide the moving path can be elongated, the cleaning position is determined with high precision.

After the brush bristle 54 is moved to the predetermined cleaning position, the brush pivot 58 is forced to overrun the support-side arm 51 to elastically deform the cleaning-side spring 55. Hence, the restoring force of the cleaning-side spring 55 prevents occurrence of the unstable actions or states and the brush bristle 54 can be placed at the cleaning position through a reliable positioning operation with high precision.

The brush arm assembly 5 is moved by the rotation of the cam gear by use of the driving source for the threading mechanism and the tracking adjusting mechanism is directly used to clean the magnetic head 4. As a result, for this purpose, it is not required to arrange any exclusive driving source. Further, it is not required to operate the driving source solely for the cleaning. In addition, the cleaning mechanism can be installed only in the side surface of the cam gear, to thereby save the space for the cleaning mechanism.

It will be understood by those of ordinary skill in the art that various changes in form and details may be made in the embodiment according to technical ideas of the present invention.

For example, in a magnetic tape apparatus, when the magnetic head cleaning mechanism in accordance with the embodiment disposed, it is possible for the magnetic tape apparatus to clean the magnetic head with high precision by use of a smaller space.

In this situation, the magnetic tape apparatus may include an accessor mechanism in which a plurality of cartridges to respectively accommodate magnetic tapes can be stored in a cartridge magazine and magnetic tape drives are attachably and detachably disposed, to thereby move a cartridge between magazines and between drives. The magnetic head cleaning mechanism in accordance with the embodiment is installed in this magnetic tape drive.

In accordance with the present invention, there is provided a magnetic head cleaning mechanism applicable to a magnetic tape apparatus using the threading system in which the cleaning member is moved through a smaller space and the positioning of the cleaning member is conducted with high precision without excessively pushing the cleaning member. Hence, it is possible to optimally clean the magnetic head.

While the invention has been particularly shown and described with reference to exemplary embodiment thereof, the invention is not limited to these embodiment. It will be understood by those of ordinary skill in the art that various changes in form and details may be made therein without departing from the spirit and scope of the present invention as defined claims.

What is claimed is:

1. A magnetic head cleaning mechanism employing a threading system comprising a threading arm which transports a leader pin disposed at a tip end of a magnetic tape wound on a supply reel up to a take-up reel, the threading arm transporting the magnetic tape through a threader track, magnetic head cleaning mechanism characterized by comprising:

a magnetic head for magnetically writing and reading data on and from the magnetic tape;

a cam gear arranged on a side of the magnetic tape relative to the threader track for driving the threading arm;

an arm mechanism including a cleaning member; and a base member for supporting the arm mechanism, the arm mechanism comprising:

a cleaning-side arm section including the cleaning member disposed at a first end thereof;

a support-side arm section including a first end which rotably and pivotally supports the cleaning-side arm section and a second end which is rotably and pivotally supported by the base member, the base member comprising a guide section to guide a moving path of the cleaning member;

the cleaning-side arm section comprising an engage section which engages with the guide section and which is movable along the guide section;

the support-side arm section being moved, when the cam gear rotates up to a predetermined position, by pushing pressure from the cam gear;

the guide section being formed to guide the moving path of the cleaning member such that the cleaning member moves through the moving path from a standby position on a side of the magnetic head relative to the threader track toward the threader track and thereafter moves from the threader track toward the magnetic head, to thereby reach a predetermined cleaning position in front of the magnetic head.

2. A magnetic head cleaning mechanism in accordance with claim 1, characterized in that the guide section is formed to move the cleaning member through an arc-shaped moving path from the standby position to the cleaning position.

3. A magnetic head cleaning mechanism in accordance with claim 1, characterized in that:

the guide section is an arc-shaped groove formed in the base member; and the engage section is a shaft formed to be insertable in the cam groove and to be movable along the cam groove.

4. A magnetic head cleaning mechanism in accordance with claim 3, characterized in that:

the arm mechanism comprises a pushing pressure transmitting section rotably and pivotally supported by the base member, the pushing pressure transmitting section being coaxial with the support-side arm section, a cleaning energizing section for pushing, by use of restoring force of elastic deformation due to pushing pressure to the pressure transmitting section, the support-side arm section in a direction to the cleaning position, and a retraction energizing section for pushing, by use of restoring force of elastic deformation, the support-side arm section in a retracting direction to the standby position;

the cam gear comprises a pushing projection to push the pushing pressure transmitting section when the leader pin is placed in the proximity of the supply reel by the threading arm; and the pushing pressure transmitting section pushes, when pushing pressure is applied thereto from the pushing projection of the cam gear, the support-side arm section by use of restoring force of the cleaning energizing section due to the pushing pressure.

5. A magnetic head cleaning mechanism in accordance with claim 4, characterized in that:

in a situation in which the pushing projection of the cam gear applies pushing pressure to the pushing pressure transmitting section, if the shaft is movable along the cam groove, the pushing pressure transmitting section is rotated as a unit together with the support-side arm section by the restoring force of the cleaning energizing section, to thereby move the shaft along the cam groove by rotation of the support-side arm section, and if the shaft is moved up to an end of a movable zone in the cam groove, the pushing pressure transmitting section elastically deforms the cleaning energizing section to a state exceeding a state in which the shaft is movable, to thereby push, by use of the restoring force of the cleaning energizing section, the support-side arm section against a contact point between the shaft and the end of the cam groove.

6. A magnetic tape apparatus, characterized by comprising a magnetic head cleaning mechanism in accordance with claim 1.

* * * * *